(12) United States Patent
Savagian et al.

(10) Patent No.: US 8,294,323 B2
(45) Date of Patent: Oct. 23, 2012

(54) CONDUCTING WIRE FOR ELECTRIC MACHINE

(75) Inventors: Peter J. Savagian, Bloomfield Hills, MI (US); Rajeev Vyas, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 347 days.

(21) Appl. No.: 12/701,875

(22) Filed: Feb. 8, 2010

(65) Prior Publication Data

US 2011/0193443 A1 Aug. 11, 2011

(51) Int. Cl.
*H02K 3/04* (2006.01)

(52) U.S. Cl. ........................................ 310/201

(58) Field of Classification Search .................. 310/201, 310/202, 203, 208
See application file for complete search history.

(56) References Cited

U.S. PATENT DOCUMENTS

| | | | |
|---|---|---|---|
| 2,407,935 A | 5/1944 | Perfetti et al. | |
| 3,860,744 A | 1/1975 | Schuler | |
| 5,587,619 A | 12/1996 | Yumiyama et al. | |
| 6,278,213 B1 | 8/2001 | Bradfield | |
| 7,173,358 B2 * | 2/2007 | Drubel | 310/201 |
| 7,385,331 B2 | 6/2008 | Sadiku et al. | |
| 2009/0261682 A1 * | 10/2009 | Fubuki et al. | 310/201 |

* cited by examiner

*Primary Examiner* — Nguyen N Hanh
(74) *Attorney, Agent, or Firm* — Quinn Law Group, PLLC

(57) ABSTRACT

A conducting wire for a stator of an electric machine includes a cross section having a first side, a second side, a third side and a fourth side. The third side and the fourth side are parallel with each other, with the first side and the second side extending between the third side and the fourth side. The first side and the second side each define a concave depression.

13 Claims, 2 Drawing Sheets

CONDUCTING WIRE FOR ELECTRIC MACHINE

TECHNICAL FIELD

The invention generally relates to an electric machine, and more specifically to a conducting wire for a stator of the electric machine.

BACKGROUND OF THE INVENTION

Electric machines, such as an electric motor, include a stator and a rotor having opposing surfaces. The stator includes a plurality of slots disposed on a surface of the stator, and a plurality of conducting wires disposed within the slots of the stator. The rotor is rotatable about an axis relative to the stator. The conducting wires generate an electromagnetic force in response to an electric current passing therethrough. The electromagnetic force acts against the rotor to cause the rotor to rotate relative to the stator.

The current density varies throughout the conducting wire based on frequency and due to the presence of magnetic fields. Typically, the majority of the current is conducted through the outer surface region of the conducting wire, commonly referred to as the "skin depth" of the conducting wire, and very little current is conducted through the core, i.e., center region, of the conducting wire. This is commonly referred to as the skin effect of the conducting wire. Additionally, when the conducting wires are disposed adjacent each other and are carrying high alternating currents, each current carrying conducting wire generates a magnetic field in the adjacent conducting wires, which produces a non-uniform distribution of the current in the adjacent conducting wires. This is commonly referred to as the proximity effect.

The conducting wire typically includes either a rectangular cross sectional shape or a circular cross sectional shape. The conducting wires should include a low AC resistance, and should also dissipate heat quickly. The rectangular shaped conducting wires include a high Alternating Current (AC) resistance at high speeds and/or frequencies due to the skin effect and the proximity effect, whereas the small diameter circular shaped conducting wire includes a low AC resistance because the skin effect covers the full cross sectional area of the conducting wire. The circular shaped conducting wire includes difficulty dissipating heat because the circular shaped conducting wire includes a smaller surface area than the rectangular shaped conducting wire, while the rectangular shaped conducting wire has better heat dissipation due to an increased surface area. Furthermore, it is difficult to extract heat from a center of a bundle of circular shaped conducting wires.

SUMMARY OF THE INVENTION

A conducting wire for a stator of an electric machine is disclosed. The conducting wire includes a transverse cross section defining a first side, a second side, a third side and a fourth side. The third side is parallel to the fourth side, and the first side and the second side extend between the third side and the fourth side. The first side and the second side each include a concave depression.

In another aspect of the invention, a stator for an electric machine is disclosed. The stator includes a body defining a plurality of slots. At least one conducting wire is disposed within each of the plurality of slots. The at least one conducting wire includes a transverse cross section defining a first side, a second side, a third side and a fourth side. The third side is parallel with the fourth side, and each of the first side and the second side include at least one concave depression.

In another aspect of the invention, an electric machine is disclosed. The electric machine includes a stator and a rotor. The stator includes a surface and defines a plurality of slots. The rotor opposes the stator and is rotatable about a longitudinal axis relative to the stator. The electric machine further includes at least one conducting wire disposed within each of the plurality of slots. The at least one conducting wire includes a transverse cross section defining a first side and a second side, with each of the first side and the second side including at least one concave depression.

Accordingly, the concave depression in each of the first side and the second side of the conducting wire increases the surface area of the conducting wire, which improves the heat dissipation of the conducting wire. Additionally, the concave depression in each of the first side and the second side of the conducting wire increases a skin depth of the conducting wire, i.e., the primary current carrying portion of the conducting wire, and reduces the core of the conducting wire, i.e., the non-current carrying portion of the conducting wire, which reduces the effective alternating current resistance at higher speeds and/or frequencies.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
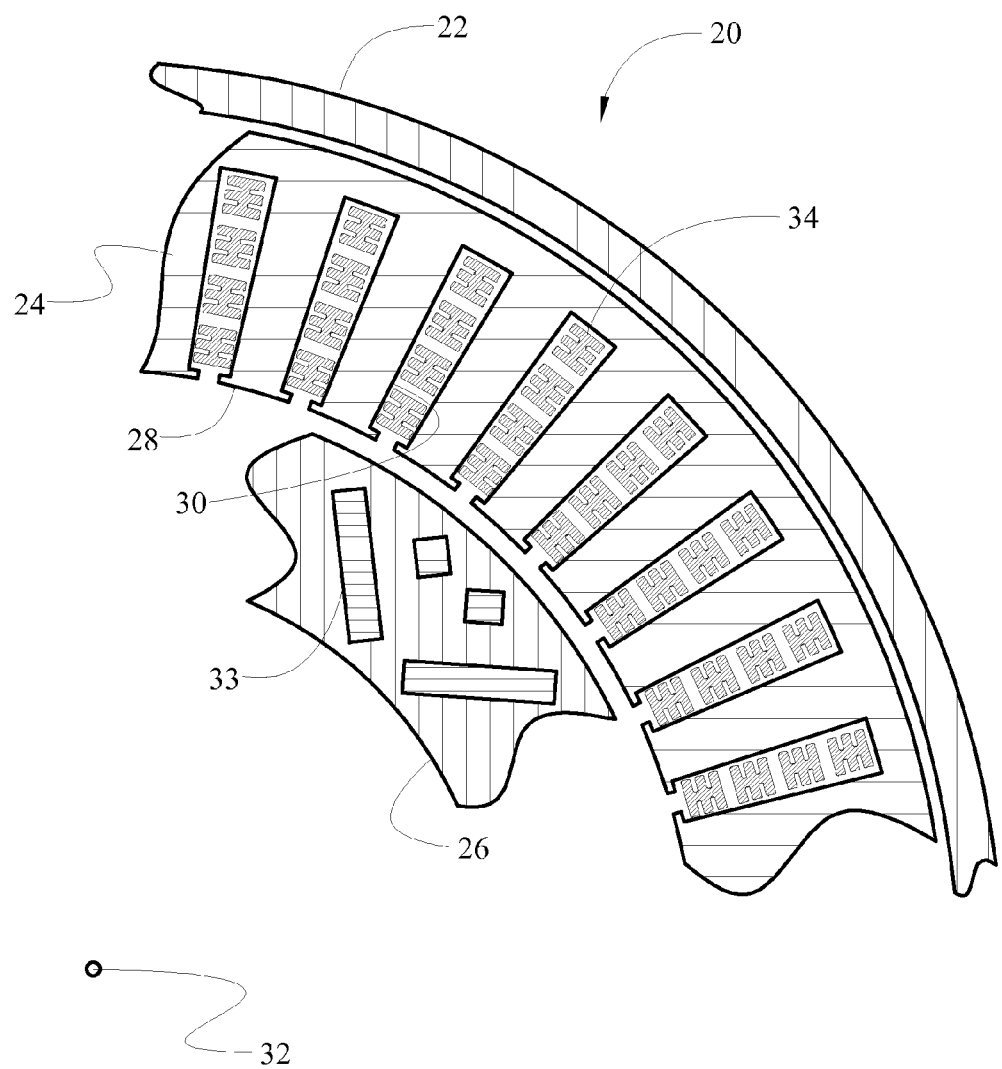
FIG. 1 is a fragmentary schematic cross sectional view of an electric motor.

Referring to the Figures, wherein like numerals indicate corresponding parts throughout the several views, an electric machine is shown generally at 20 in FIG. 1. The electric machine 20 may include an electric motor configured for converting an electric current into mechanical motion, an electric generator configured for converting mechanical motion into an electric current, or some other similar device.

Referring to FIG. 1, the electric machine 20 includes a housing 22, a stator 24 and a rotor 26. The stator 24 is fixedly coupled to the housing 22. The stator 24 includes an interior circumferential surface 28, and defines a plurality of slots 30. The slots 30 extend radially outward from the interior circumferential surface 28 into the stator 24. The rotor 26 opposes the stator 24 and is rotatably coupled to the housing 22. The rotor 26 is rotatable about a longitudinal axis 32 relative to the stator 24, and includes a plurality of magnets 33 as is well known. The electric machine 20 as described so far is typical of and operates in the same manner as known electric machines 20, and as such, the components, the orientation of the components relative to each other and operation thereof are not described in detail herein.

Figure 2:
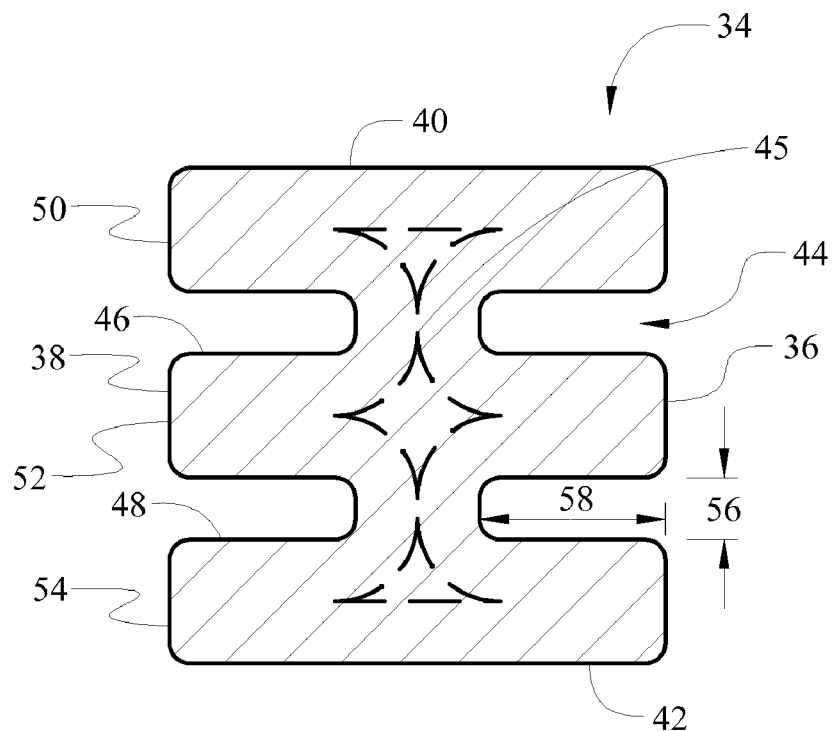
FIG. 2 is a schematic cross sectional view of a first embodiment of a conducting wire of the electric motor.

Referring also to FIG. 2, the electric motor 20 further includes at least one conducting wire 34 disposed within each of the plurality of slots 30. The conducting wire 34 includes a transverse cross section that defines a first side 36, a second side 38, a third side 40 and a fourth side 42. The third side 40 and the fourth side 42 are parallel with each other, with the first side 36 and the second side 38 extending between the third side 40 and the fourth side 42. Each of the third side 40 and the fourth side 42 are perpendicular to both of the first side 36 and the second side 38. As shown, the first side 36 is symmetrical with the second side 38, and each of the first side 36 and the second side 38 include at least one concave depression 44. However, it should be appreciated that the first side 36 may alternatively be asymmetrical with the second side 38. As shown, the concave depressions 44 in the first side 36 are mirror images of the concave depressions 44 in the second side 38. Alternatively, if the first side 36 is asymmetrical with the second side 38, then concave depressions 44 in the first side 36 are not mirror images of the concave depressions 44 in the second side 38. The concave depressions 44 in the first side 36 and the second side 38 increase the surface area of the conducting wire 34, which improves heat dissipation of the conducting wire 34. Additionally, the concave depressions 44 reduce a core area 45, i.e., center region, of the conducting wire 34 that conducts little or no current, thereby increasing the Alternating Current (AC) resistance at high speeds and/or frequencies. The geometric shape and/or configuration of the concave depressions 44 may be optimized for the specific frequency and magnetic field present in the electric machine 20. As such, the specific geometric shape and size of the concave depressions 44 may vary for each specific use.

As shown in FIG. 2, the at least one concave depression 44 in each of the first side 36 and the second side 38 includes a first depression 46 and a second depression 48. It should be appreciated that the at least one concave depression 44 may include more depressions than the first depression 46 and the second depression 48 shown in FIG. 2. For example, the concave depression 44 may include three, four, five or more depressions in each of the first side 36 and the second side 38.

Preferably, the first depression 46 and the second depression 48 in each of the first side 36 and the second side 38 are evenly spaced between the third side 40 and the fourth side 42. However, it should be appreciated that the first depression 46 and the second depression 48 may be oriented relative to the third side 40 and the fourth side 42 other than shown and described herein.

The third side 40, the first depression 46, the second depression 48 and the fourth side 42 cooperate to define a plurality of fingers therebetween on each of the first side 36 and the second side 38 respectively. More specifically, the third side 40 and the first depression 46 cooperate to define a first finger 50 therebetween, the first depression 46 and the second depression 48 cooperate to define a second finger 52 therebetween and the second depression 48 and the fourth side 42 cooperate to define a third finger 54 therebetween. It should be appreciated that the number of fingers defined in each of the first side 36 and the second side 38 is dependent upon the number of concave depressions 44 in the first side 36 and the second side 38 respectively.

Each of the first depression 46 and the second depression 48 in each of the first side 36 and the second side 38 include a width 56 and a length 58. The width 56 of the first depression 46 and the second depression 48 in each of the first side 36 and the second side 38 is measured parallel to the first side 36 and the second side 38 respectively. The length 58 of the first depression 46 and the second depression 48 in each of the first side 36 and the second side 38 is measured perpendicular to the first side 36 and the second side 38 respectively. As shown in FIG. 2, the lengths 58 of the first depression 46 and the second depression 48 are greater than the widths 56 of the first depression 46 and the second depression 48 respectively.

The conducting wire 34 shown in FIG. 2 may be formed by any suitable method, including drawing the conducting wire 34 into the above described shape, rolling the conducting wire 34 into the above described shape or folding the conducting wire 34 to define the above described shape. The conducting wire 34 includes and is preferably manufactured from copper. However, it should be appreciated that the conducting wire 34 may be manufactured from some other material. The conducting wire 34 may be coated with, but is not required to be coated with, an enamel, including but not limited to a polyamide. Additionally, the conducting wire 34 may be coated with, but is not required to be coated with, a non-conductive conversion coating, including but not limited to a stabilized metal oxide.

Figure 3:
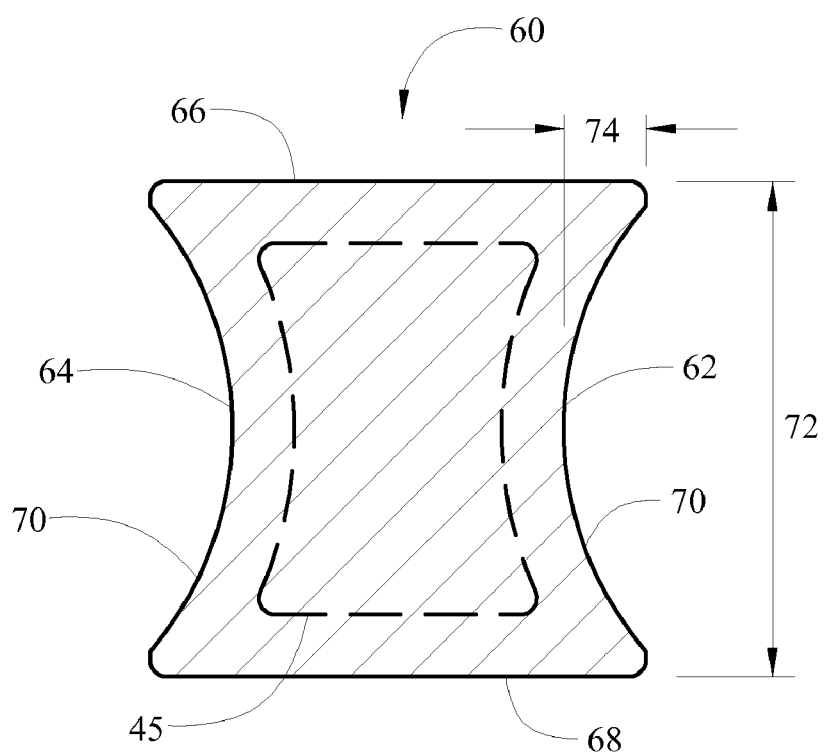
FIG. 3 is a schematic cross sectional view of a second embodiment of the conducting wire of the electric motor.

Referring to FIG. 3, an alternative embodiment of conducting wire is shown generally at 60. The alternative embodiment of the conducting wire 60 includes a transverse cross section that defines a first side 62, a second side 64, a third side 66 and a fourth side 68. The third side 66 and the fourth side 68 are parallel with each other, with the first side 62 and the second side 64 extending between the third side 66 and the fourth side 68. As shown, the first side 62 is symmetrical with the second side 64, and each of the first side 62 and the second side 64 include at least one concave depression 70. However, it should be appreciated that the first side 62 may alternatively be asymmetrical with the second side 64, such that the first side 62 is not a mirror image of the second side 64.

The concave depression 70 of the alternative embodiment of the conducting wire 60 in each of the first side 62 and the second side 64 extends fully between the third side 66 and the fourth side 68. In other words, each of the first side 62 and the second side 64 include a single concave depression 70, with the concave depression 70 defining the entire first side 62 and second side 64 respectively. The concave depression 70 includes a width 72 and a length 74. The width 72 of the concave depression 70 in each of the first side 62 and the second side 64 is measured parallel to the first side 62 and the second side 64 respectively. The length 74 of the concave depression 70 in each of the first side 62 and the second side 64 is measured perpendicular to the first side 62 and the second side 64 respectively. As shown in FIG. 3, the width 72 of the concave depression 70 in each of the first side 62 and the second side 64 is greater than the length 74 of the concave depression 70 in the first side 62 and the second side 64.

It should be appreciated that the conducting wire 34, 60 may be formed to include a cross sectional shape other than shown in FIGS. 2 and 3 and described herein, and still fall within the scope of the appended claims.

While the best modes for carrying out the invention have been described in detail, those familiar with the art to which this invention relates will recognize various alternative designs and embodiments for practicing the invention within the scope of the appended claims.

The invention claimed is:

1. An electric machine comprising:
    a stator having a surface defining a plurality of slots;
    a rotor opposing said surface of said stator and rotatable about a longitudinal axis relative to said stator; and
    at least one conducting wire disposed within each of said plurality of slots, said at least one conducting wire including a transverse cross section defining a first side and a second side, wherein each of said first side and said second side includes at least one concave depression;
    wherein each of said at least one conducting wire includes a third side and a fourth side parallel with said third side;
    wherein said at least one concave depression in each of said first side and said second side extends between said third side and said fourth side; and
    wherein said at least one concave depression includes a width and a length, wherein said width of said concave depression in each of said first side and said second side is measured parallel to said first side and said second side respectively, and said length of said concave depression in each of said first side and said second side is measured perpendicular to said first side and said second side respectively, wherein said width is greater than said length.

2. An electric machine comprising:
a stator having a surface defining a plurality of slots;
a rotor opposing said surface of said stator and rotatable about a longitudinal axis relative to said stator; and
at least one conducting wire disposed within each of said plurality of slots, said at least one conducting wire including a transverse cross section defining a first side and a second side, wherein each of said first side and said second side includes at least one concave depression;
wherein each of said at least one conducting wire includes a third side and a fourth side parallel with said third side; and
wherein said at least one concave depression in each of said first side and said second side includes a first depression and a second depression.

3. An electric machine as set forth in claim 2 wherein said first depression and said second depression in each of said first side and said second side are evenly spaced between said third side and said fourth side.

4. An electric machine as set forth in claim 3 wherein each of said first depression and said second depression in each of said first side and said second side include a width and a length, wherein said width of said first depression and said second depression in each of said first side and said second side is measured parallel to said first side and said second side respectively, and said length of said first depression and said second depression in each of said first side and said second side is measured perpendicular to said first side and said second side respectively, wherein said length is greater than said width.

5. A stator for an electric machine, the stator comprising:
a body defining a plurality of slots; and
at least one conducting wire disposed within each of said plurality of slots, said at least one conducting wire including a transverse cross section defining a first side, a second side, a third side and a fourth side, wherein said third side is parallel with said fourth side, and wherein each of said first side and said second side include at least one concave depression;
wherein said at least one concave depression in each of said first side and said second side extends between said third side and said fourth side; and
wherein said at least one concave depression includes a width and a length, wherein said width of said concave depression in each of said first side and said second side is measured parallel to said first side and said second side respectively, and said length of said concave depression in each of said first side and said second side is measured perpendicular to said first side and said second side respectively, wherein said width is greater than said length.

6. A stator for an electric machine, the stator comprising:
a body defining a plurality of slots; and
at least one conducting wire disposed within each of said plurality of slots, said at least one conducting wire including a transverse cross section defining a first side, a second side, a third side and a fourth side, wherein said third side is parallel with said fourth side, and wherein each of said first side and said second side include at least one concave depression;
wherein said at least one concave depression in each of said first side and said second side includes a first depression and a second depression.

7. A stator as set forth in claim 6 wherein said first depression and said second depression in each of said first side and said second side are evenly spaced between said third side and said fourth side.

8. A stator as set forth in claim 7 wherein each of said first depression and said second depression in each of said first side and said second side include a width and a length, wherein said width of said first depression and said second depression in each of said first side and said second side is measured parallel to said first side and said second side respectively, and said length of said first depression and said second depression in each of said first side and said second side is measured perpendicular to said first side and said second side respectively, wherein said length is greater than said width.

9. A conducting wire for a stator of an electric machine, the conducting wire comprising:
a transverse cross section defining a first side, a second side, a third side and a fourth side;
wherein said third side is parallel to said fourth side, and said first side and said second side extend between said third side and said fourth side;
wherein said first side and said second side each include a concave depression;
wherein said at least one concave depression in each of said first side and said second side extends between said third side and said fourth side; and
wherein said at least one concave depression includes a width and a length, wherein said width of said concave depression in each of said first side and said second side is measured parallel to said first side and said second side respectively, and said length of said concave depression in each of said first side and said second side is measured perpendicular to said first side and said second side respectively, wherein said width is greater than said length.

10. A conducting wire for a stator of an electric machine, the conducting wire comprising:
a transverse cross section defining a first side, a second side, a third side and a fourth side;
wherein said third side is parallel to said fourth side, and said first side and said second side extend between said third side and said fourth side;
wherein said first side and said second side each include a concave depression; and
wherein said at least one concave depression in each of said first side and said second side includes a first depression and a second depression.

11. A conducting wire as set forth in claim 10 wherein said first depression and said second depression in each of said first side and said second side are evenly spaced between said third side and said fourth side.

12. A conducting wire as set forth in claim 11 wherein each of said first depression and said second depression in each of said first side and said second side include a width and a length, wherein said width of said first depression and said second depression in each of said first side and said second side is measured parallel to said first side and said second side respectively, and said length of said first depression and said second depression in each of said first side and said second side is measured perpendicular to said first side and said second side respectively, wherein said length is greater than said width.

13. A conducting wire as set forth in claim 12 wherein each of said third side and said fourth side are perpendicular to both of said first side and said second side.

* * * * *